United States Patent [19]

Kaufman et al.

[11] Patent Number: 4,544,892
[45] Date of Patent: Oct. 1, 1985

[54] SIGNAL PROCESSING APPARATUS FOR FREQUENCY DOMAIN GEOPHYSICAL ELECTROMAGNETIC SURVEYING SYSTEM

[75] Inventors: Alexander A. Kaufman, Lakewood, Colo.; James D. McNeill, Don Mills, Canada

[73] Assignee: Geonics Limited, Mississauga, Canada

[21] Appl. No.: 408,748

[22] Filed: Aug. 17, 1982

[30] Foreign Application Priority Data

Feb. 18, 1982 [CA] Canada .................................. 396553

[51] Int. Cl.[4] .............................................. G01V 3/10
[52] U.S. Cl. .................................... 324/334; 324/336
[58] Field of Search ............... 324/330, 334, 336, 362, 324/233, 239

[56] References Cited

U.S. PATENT DOCUMENTS

| 2,931,973 | 4/1960 | Puranen ........................ 324/330 X |
| 3,315,155 | 4/1967 | Colani .......................... 324/239 |
| 3,538,430 | 11/1970 | Bulgakov et al. .................. 324/336 |
| 3,555,408 | 1/1971 | Robinson ........................ 324/330 |
| 3,614,600 | 10/1971 | Ronka .......................... 324/330 |
| 3,737,768 | 6/1973 | Lazenby et al. .................. 324/336 |
| 3,876,930 | 4/1975 | Seigel ......................... 324/362 X |

FOREIGN PATENT DOCUMENTS 0729543 4/1980 U.S.S.R. ............................ 324/336

OTHER PUBLICATIONS

"Resolving Capabilities of the Inductive Methods of Electroprospecting" A. A. Kaufman, Geophysics, vol. 43, No. 7 (Dec. 1978), pp. 1392-1398.
"Applications of Transient Electromagnetic Techniques" J. D. McNeill, Technical Note TN-7, Geonics Limited, Oct. 1980.

Primary Examiner—Gerard R. Strecker
Attorney, Agent, or Firm—Ridout & Maybee

[57] ABSTRACT

A frequency domain geophysical electromagnetic surveying system is provided in which intermittent primary fields having sharp terminations are generated in a cycle having a fundamental frequency by a transmitter, and a receiver includes a gate passing only secondary signals received during interruptions of the primary field, the gated signal being applied to filters tuned to harmonics of the predetermined frequency. The filter outputs are synchronously demodulated to provide signals corresponding to at least the in-phase component of the secondary signal at the fundamental frequency, and preferably in-phase and quadrature components at at least two harmonics. The system can provide improved resolution particularly of the characteristics of in-phase secondary signals received from terrain being surveyed.

6 Claims, 3 Drawing Figures

SIGNAL PROCESSING APPARATUS FOR FREQUENCY DOMAIN GEOPHYSICAL ELECTROMAGNETIC SURVEYING SYSTEM

FIELD OF THE INVENTION

This invention relates to geophysical electromagnetic surveying systems.

BACKGROUND OF THE INVENTION

In such systems, terrain to be surveyed is subjected to a primary electromagnetic field, and measurements are made of signals induced in a receiver by secondary magnetic fields generated by current induced in the terrain by the primary magnetic field. The secondary magnetic field, in practical situations, comprises (assuming an alternating primary field) components both in phase with and in quadrature with the primary field. A problem with all such systems is that the primary field is very large compared with the secondary field, which leads to difficulty in isolating the desired secondary signals. One approach to these problems in techniques of the frequency domain type, in which both a transmitter which generates the primary field and the receiver are operated at one or more defined frequencies is to provide a receiver in which the current induced by the primary field is cancelled so as to leave only the desired currents induced by the secondary fields. Such cancellation arrangements, if effective, are usually complex and/or critically dependent on the maintenance of a predetermined geometrical relationship between a transmitter of the primary signal and the receiver. Slight variations in this geometry, which are to some degree inevitable, produce inaccuracies of cancellation which show up as noise in the received signal. These problems are of course most serious in relation to the in-phase component of the secondary signal. All of these problems are aggravated by the fact that for most purposes it is desirable to use frequencies that are as low as possible, which still further reduces the relative magnitude of the secondary signal.

An alternative approach has been to utilize so-called transient techniques, in which the primary field is interrupted at intervals, and a potential induced in the receiver representative of the rate of change of the secondary field is sampled at intervals during these interruptions. Since the primary field is unchanging at a zero level during the measurements, the problems associated with cancellation are avoided, and the equivalent of low frequency observations can be achieved merely by sufficiently delaying sampling of the transient signal, but the available time derivatives of the secondary signal components are of relatively smaller magnitude, and become increasingly smaller the longer sampling is delayed, thus again impairing signal-to-noise ratios. It has also been widely believed that such transient techniques only provide data as to the quadrature components of the secondary signal, upon the reasoning that any primary component would be in phase with the primary signal, and thus since no measurements are made in the presence of the primary signal, no measurements are made of the in-phase component of the secondary signal. Whilst this reasoning is fallacious, it is true that known transient techniques fail to discriminate between the in-phase and quadrature components of the secondary signal.

A characteristic of transient systems is that they are essentially broadband in nature since the response will contain components extending through the frequency spectrum. This of course implies a broadband receiver so that decay of the transient secondary signal can be observed for long enough to enable its information content to be exploited. This characteristic also is associated with noise problems.

In his paper "Resolving Capabilities of the Inductive Methods of Electroprospecting" published in Geophysics, Vol. 43, No. 7 (Dec. 1978), pages 1392-1398, one of the inventors discusses the relative theoretical resolving powers of the frequency domain and transient methods, in terms of their capability of distinguishing wanted signals from geological noise. In that paper, he concluded that for multispectral frequency domain systems excellent rejection of the effects of geological noise could be achieved by measuring the low frequency in-phase components of the received signal but that, since these are of low amplitude, this is difficult to carry out for the reasons given above.

SUMMARY OF THE INVENTION

A primary objective of the invention is to provide improved recovery of in-phase secondary signals in a frequency domain system.

A further objective of the present invention is to provide a frequency domain method which renders it practical to resolve higher order terms of the expansions, both for the quadrature and in-phase components. This makes it possible to resolve successive signal components which are proportional to odd and even powers respectively of the conductivity of terrain features, thus substantially increasing the capability of the system for resolving signals from features of different conductivities.

According to the invention, apparatus is provided for processing signals from a geophysical electromagnetic survey of the type in which terrain to be surveyed is subjected to a primary magnetic field by a transmitter energized by a cyclical current waveform such that the field is subject to abruptly commencing interruptions at regular intervals, and a receiver produces secondary signals corresponding to current induced at the receiver during the interruptions by transient secondary fields induced in the terrain by the abrupt commencement of the interruptions, the apparatus being configured to process only such secondary signals as occur during regular predetermined intervals within the interruptions, together with a reference signal in synchronism with said cyclical current waveform, and to apply such secondary signals to a narrow band filter tuned to accept the fundamental frequency of the cyclical current waveform, the output of the filter together with said reference signal being applied to a first synchronous detector which detects the filter output in relation to the phase of the primary current waveform on a detection axis adjusted to provide any phase compensation necessary for the periods in which the secondary signal is not processed, whereby to recover at least the in-phase component of the secondary signal at said fundamental frequency. Preferably, the apparatus includes further filters and synchronous detectors so as to isolate both in-phase and quadrature phase components of the secondary signal at at least two harmonic components of the primary signal frequency, one of which may be the fundamental. Although it is acknowledged that the quadrature phase signal component can be extracted in the presence of the primary field it, too, is more easily processed in the absence of the primary field since, for example, small errors in phase do not then lead to large errors in the quadrature phase component.

Further features of the invention will be apparent from the following description of an exemplary embodiment of the invention with reference to the accompanying drawings, in which:

SHORT DESCRIPTION OF THE DRAWINGS

DESCRIPTION OF THE PREFERRED EMBODIMENT

Figure 1:
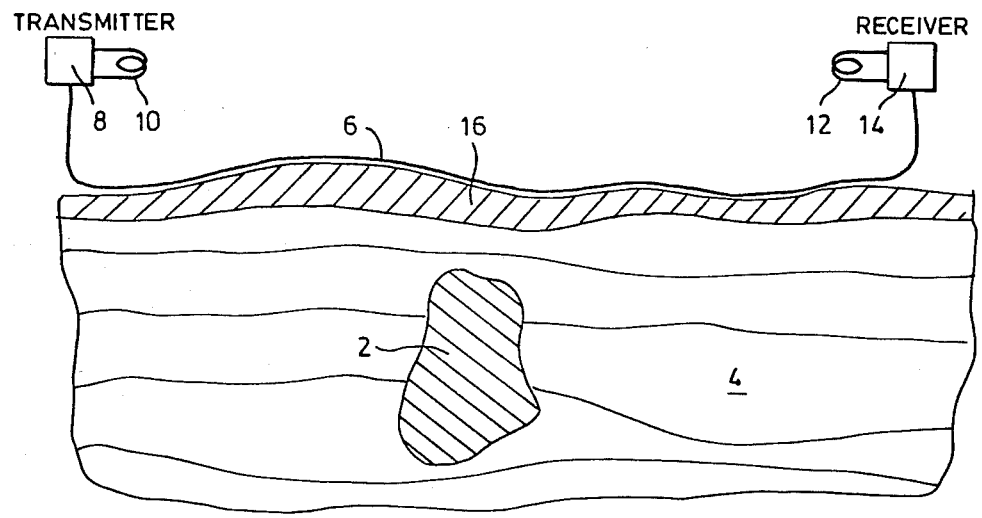
FIG. 1 is a diagrammatic representation showing a geophysical surveying system located above terrain to be surveyed.

Referring to FIG. 1, terrain to be surveyed is shown in cross section, formations shown being a conductive ore body 2, possibly conductive host rock 4 and possibly conductive overburden 6. A transmitter 8 energizes a transmitter coil 10 to generate a primary magnetic field, whilst a receiver coil 12 generates currents induced by primary and secondary fields and applies them to a receiver 14. A cable 16 transmits a reference signal from the transmitter to the receiver. Other equivalent means such as a radio link, or quartz crystal oscillators synchronized to a common reference, may also of course be used if desired. All of the formations will give rise to secondary signals which may be received by an electromagnetic surveying system and which are rather difficult to differentiate, although only signals from the ore body will normally be of interest, the remaining signals being merely "geological noise". Moreover, since the ore body is the formation most distant from the surveying system, its signals may well be the weakest, particularly if it is deeply buried. On the other hand, whilst the response of each formation is frequency dependent, the nature of this dependency and the phase of the response is influenced by parameters of the formation, notably its conductivity and configuration.

Figure 3:
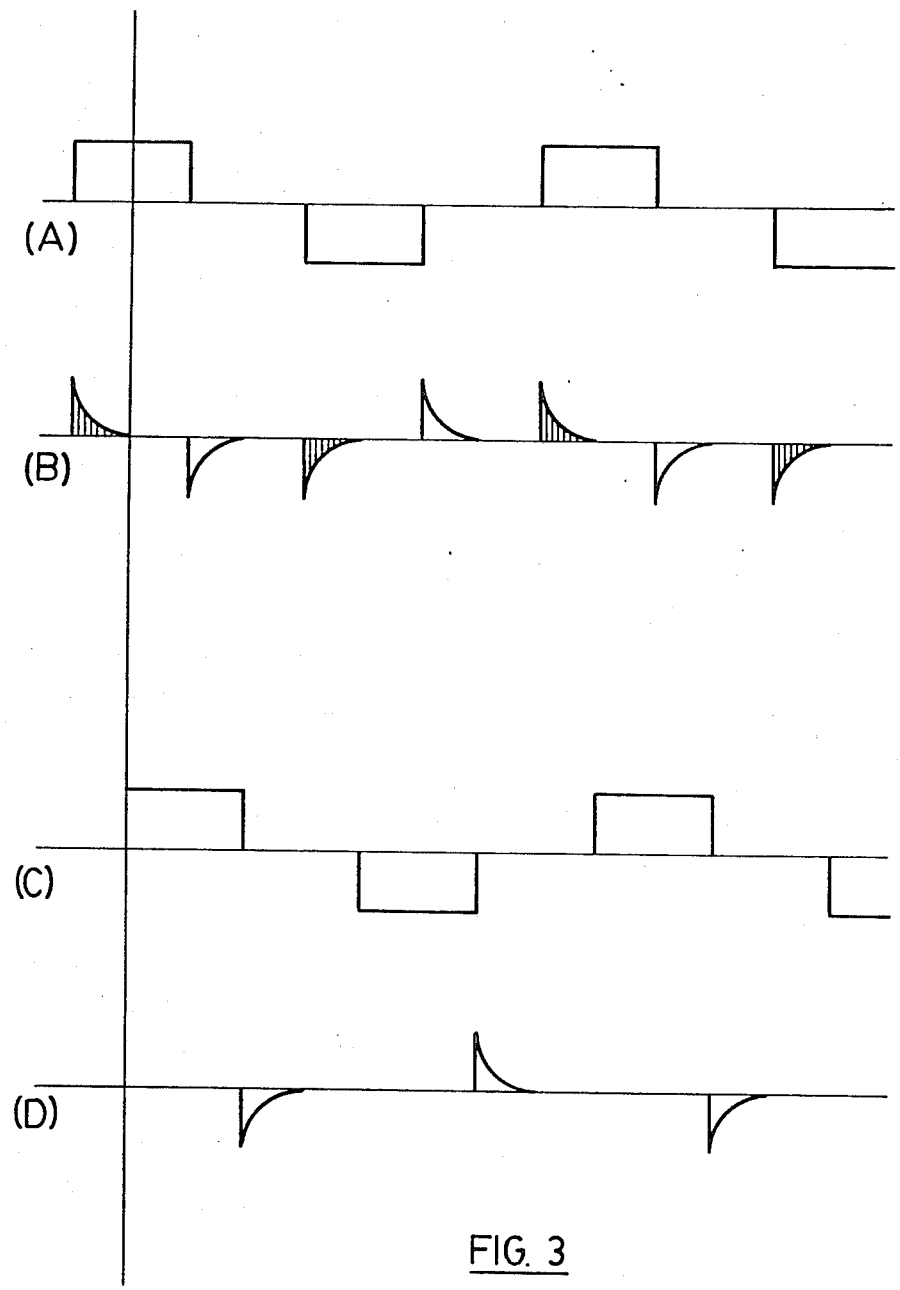
FIG. 3 is a diagram illustrating current waveforms present at various points in the system.

In order to provide the system shown in FIG. 1 with the capabilities which are the object of the present invention, the transmitter 10 and coil 12 are arranged to generate a discontinuous magnetic field such as is shown in line A of FIG. 3, which illustrates the current waveform in the transmitter coil. This current also determines the primary field strength. This waveform is similar to that used in some transient systems, comprising regular rectangular current pulses of alternate polarity separated by off periods, in a repeated cycle of known frequency. Typically, this frequency will be in the order of 25–100 $H_z$, frequencies corresponding to the fundamental of harmonics of the local power supply frequency being avoided. Thus in areas with a 60 $H_z$ supply frequency, a frequency of 90 or 30 $H_z$ may be selected.

The response current at the receiver coil will also be similar to the response potential characteristic of transient systems, being a series of decaying pulses as shown in line B of FIG. 3. The duration and configuration of the primary current cycle is such that each pulse has decayed substantially to zero before commencement of the next pulse.

Figure 2:
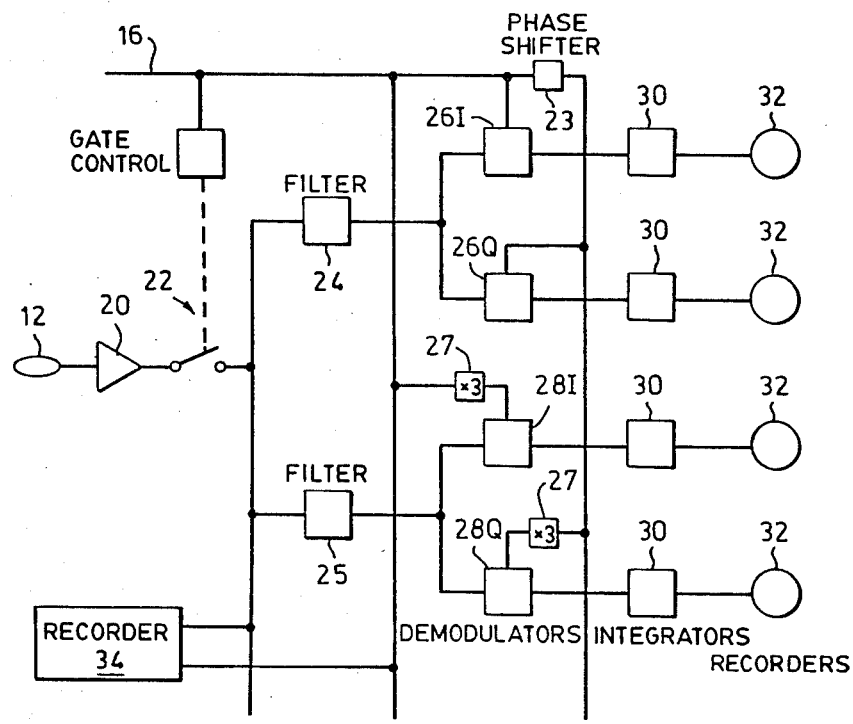
FIG. 2 is a block diagram showing essential features of the receiver shown in FIG. 1.

It should be understood that the exact configuration of the primary waveform is not critical to the invention, as long as it exhibits abrupt termination of the current flow at regular intervals, each termination being preceded by a sufficient period in which the current is changing sufficiently slowly for any secondary field to have diminished substantially to zero, and followed by a sufficient period in which the current is zero for any secondary field resulting from the termination to diminish substantially to zero. The current prior to termination may either always be in the same direction, or in alternate directions. In the latter case there will be two terminations in each cycle of the fundamental repetition frequency. Termination of the primary current should be sufficiently abrupt to avoid attenuation of any harmonics likely to produce secondary signals of interest. Transmitters and transmitter coils intended for transient systems are suitable for use in the present invention as long as they can generate appropriate waveforms in a cycle of predetermined frequency. The receiver 14 (see FIG. 2) accepts the current pulses induced in the coil 12 and subjects them to broadband amplification in a preamplifier 20. They are then subjected to gating by a switch or transmission gate 22 synchronized with the primary signal so as to pass signals only for intervals wholly within the periods when no current is flowing in the transmitter coil. The effect of this gating is to eliminate signals received whilst current is passing in the transmitter coil, thus leaving only those pulses following termination of current flow in the primary, these representing solely the response to the secondary field during the on times of the gate. Thus far the receiver is again similar to that used in many transient systems, except that signal processors in transient systems treat the receiver coil as a voltage source rather than a current source.

The switched signal, either direct from the switch 22 or from the recording device 34 is then applied to a series of narrow band filters of which the first two filters 24, 25 are shown. The filters are tuned to the fundamental and odd harmonics of the primary signal frequency so as to resolve the components of the secondary response attributable to each of these harmonic components. The outputs of the filters are then subjected to synchronous detection on the in-phase and quadrature axes using a reference signal derived from that on cable 16 or recorded by device 34. To take account of the deletion of parts of the received signal for the transmitter current waveform shown in FIG. 3A the phase of the reference signal is shifted so that the in-phase component of the received signal (the sine component of the Fourier series) is measured with the received signal located in time as shown in lines C and D of FIG. 3. Such correction is not necessary if the primary waveform is unipolar. The phase of the reference is then shifted a further 90° by phase shifter 23 to derive a quadrature phase reference so as to measure the cosine term. The in-phase and quadrature reference signals are applied directly to in-phase and quadrature demodulators 26I and 26Q receiving inputs from filter 24 so as to yield rectified DC output signals proportional to the fundamental in-phase and quadrature phase components of the signal shown in FIG. 3C. The same reference signals, after having been frequency multiplied by three in multipliers 27 are applied directly to in-phase and quadrature phase demodulators 28I and 28Q, receiving inputs from filter 25 (also tuned to the third harmonic) if the in-phase and quadrature phase components of the signal at the third harmonic are desired. In the same way the inphase and quadrature phase components at any other harmonic frequency are obtained. The harmonic components utilized are not necessarily the fundamental and odd harmonics, depending on the primary current waveform. If this waveform is rich in even rather than odd harmonics, then it may be preferred to recover and demodulate the former in addition to the fundamental.

The demodulator outputs are applied to integrators 30 and thence to indicators or recorders 32 or to further processing circuitry. The outputs may be utilized in various ways so as to exploit the capability of the invention to resolve the in-phase components of the secondary signal whilst its capability of providing readings at several frequencies simultaneously may permit further data relating to terrain structure to be resolved.

In the simplest form of interpretation, the in-phase output of the fundamental frequency of the primary field is studied. As compared with a conventional frequency domain system operating at the same frequency and as discussed further below, noise due to changes in system geometry or imperfect cancellation of the primary signal is eliminated. These factors normally limit the lowest frequency at which such systems can be used, since the amplitude of the wanted secondary signal is proportional to the square of the frequency. The present invention further renders the separation of the transmitter and receiver coils non-critical; indeed the coils may be co-located, or even the same coil may be utilized since the secondary signal is never required when the primary current is present. Proximity of the transmitter and receiver coils improves the accuracy with which terrain features of interest may be located.

In an alternative form of interpretation, the various outputs are simply compared after applying an amplitude correction factor to compensate for the different frequencies to which the outputs relate. Assuming for example that the output signal is due essentially to a buried ore body of high conductivity, and an overburden of lower conductivity, the relative contribution to the signal due to the ore body will be different in the various output signals. Thus at low frequencies as between the outputs derived from the frequency component at any one harmonic, each contribution to the quadrature response will be in direct proportion to the conductivities of the ore body and the overburden respectively, in each case multiplied by a factor dependent inter alia upon the location, dimensions and configuration of the body and overburden relative to the position or positions of the transmitter and receiver. In the case of the in-phase response, each contribution will however be in proportion to the square of the respective conductivities. The relative contribution of the higher conductivity body will decrease in the signals derived from the higher harmonics, but these signals can nevertheless be of importance, as will be apparent from the following discussion.

Considering now the outputs derived from the third harmonic as compared to the fundamental frequency, each pair of outputs may of course be compared in the same way, but preferably for the case of the in-phase components the third harmonic outputs are subtracted from the fundamental frequency outputs after appropriate adjustment of their relative amplitude to eliminate frequency dependent amplitude differences. In the case under consideration, the third harmonic signals are divided by 9: this correction may be applied if desired by an attenuator network associated with the integrator 30. In the resulting difference signals, the difference between responses due to terrain features of different conductivities will be further emphasised. This procedure may be repeated for outputs derived from the fifth harmonic, and theoretically, can be repeated indefinitely, but a practical limit will be set by signal noise and processing inaccuracies. A similar approach can be applied to the quadrature phase components.

It will be appreciated therefore that the system of the invention provides a means which assists in distinguishing the contribution to the secondary signal of a terrain feature of high conductivity from contributions due to features of lower conductivity, even when the signals from such latter features, because of proximity to the point of observation orientation and/or large physical extent, would normally mask wanted signals from the high conductivity feature if the latter is deeply buried. The extent to which this emphasis can be achieved during signal processing is clearly highly dependent upon the extent to which the wanted signal is otherwise influenced by noise, and in this respect the present invention demonstrates important advantages relative to the conventional frequency domain systems.

The portion of the secondary signal which is processed is generated in the absence of the primary signal. This distinguishes the present invention from known frequency domain systems in which the secondary signal is measured in the presence of the primary signal. Although cancellation techniques may be used to tackle this problem, such techniques are noise prone, and noise so introduced limits the value of the measurements particularly of the in-phase component of the secondary signal. This is unfortunate, since as has been explained above, the in-phase component will contain a relatively larger contribution from highly conductive features.

As a further advantage, the absence of the primary signal during measurement means that the separation of the transmitter and receiver coils is non-critical and may be small, a particular advantage in airborne systems.

As compared with transient systems, the present invention has the advantage of being narrow-band, thus facilitating noise rejection. Although it might seem that the rejection, by the switching technique of the present invention, of half of the available secondary signal information would be detrimental, in fact the amplitude of the output signals is reduced only by a factor of $\frac{1}{2}$ and since the noise level due to spherics and other external sources is reduced by a similar amount, the loss is mainly compensated, whilst all noise derived from the primary signal is wholly rejected.

The conventional approach to overcoming external noise problems in transient systems has been to increase the power of the transmitter on the one hand, and to combine the readings from multiple transients on the other hand. Both these solutions create problems, either through bulk and power consumption or slowness of response, particularly when the survey equipment is to be used in airborne applications. The present invention provides the potential of enabling features of interest to be resolved more rapidly and/or with lower transmitter power, and thus is particularly advantageous in airborne and portable systems.

Existing transient systems can in many cases be modified to provide signals for use in a frequency domain system in accordance with the invention by utilizing the signal processing circuits described above. Thus known equipment may be utilized to generate current signals which are stored on a recorder 34 for later analysis. The recordings consist of the wanted secondary signals on one channel together with a second channel carrying a reference signal determinative of the timing of the primary signal. In some cases data available on the secondary signal channel may be used to recover the required reference signal.

Although the signal processing circuits and in particular the filters 24,25 and the demodulators 26I, 26Q, 28I, 28Q may be implemented conventionally by analogue circuitry, it may be preferred to digitize the secondary signal data and use digital filtering and demodulation techniques which may be conveniently implemented utilizing a suitably programmed microprocessor. Moreover, if the secondary signal data is recorded, the data need not be processed in real time, and the frequences utilized may be shifted as desired, typically upwards, to provide more rapid processing. From the signal processing point of view, however, the functions achieved will be those described above.

Whilst the invention has been described with particular reference to surface and airborne surveys, it is equally applicable to data from borehole surveys. In such surveys, the in-phase signals recovered by the method of the invention are diagnostic of conditions at a greater distance from the hole as compared to quadrature signals obtained with conventional techniques, thus increasing the effective exploration radius for each hole.

For the avoidance of misunderstanding, the terms "in-phase signal" and "in-phase component" used in this disclosure and in the appended claims refer to signals and signal components proportional to currents and current components induced by the in-phase component of the secondary field, without necessarily implying that a particular phase relationship to the primary field is maintained during processing.

We claim:

1. Apparatus for processing signals in the frequency domain from a geophysical electromagnetic survey of the type in which terrain to be surveyed is subjected to a primary magnetic field by a transmitter energized by a cyclical current waveform such that the field is subject to abruptly commencing interruptions at regular intervals, and a receiver coil is responsive to secondary fields induced in the terrain, during the interruptions, the apparatus comprising a receiver producing secondary signals representative of the magnitude of the currents induced in the coil by the secondary fields, switching means configured to pass only such secondary signals, corresponding to currents induced in the receiver coil, as occur during regular predetermined intervals within the interruptions, a source of a reference signal in synchronism with said cyclical current waveform, means to control said switching means responsive to said reference signal, a narrow band filter receiving the output of the switching means and tuned to accept the fundamental frequency of the cyclical current waveform, at least a first synchronous detector receiving the output of the filter together with said reference signal whereby to detect the filter output in relation to the phase of the primary current waveform on a detection axis selected to recover the in-phase component of the secondary signal at said fundamental frequency.

2. Apparatus according to claim 1, further including a second synchronous detector receiving said filter output and said reference signal and which has a detection axis in quadrature with that of the first synchronous detector whereby to receive the quadrature phase component of the secondary signal at said fundamental frequency.

3. Apparatus according to claim 1, further including one or more additional narrow band filters each tuned to a different higher harmonic of said fundamental frequency, and each associated with in-phase or in-phase and quadrature synchronous detectors receiving reference signals at frequencies which are multiples of the fundamental frequency appropriate to the harmonic to be detected, whereby to recover at least in-phase components of at least two different harmonic components of said secondary signal.

4. Apparatus according to claim 3, further including means to determine the amplitude difference of similarly phased outputs of detectors associated with filters tuned to different harmonic components, after compensation of said outputs to eliminate frequency dependent amplitude differences.

5. Apparatus according to any of claims 1 or 3 for processing signals which are prerecorded, the apparatus further including means for recovering secondary and reference signals from a record of such signals.

6. A frequency domain geophysical electromagnetic surveying system comprising apparatus according to any of claims 1 or 3, together with a transmitter adapted to submit terrain being surveyed to successive abruptly terminated magnetic fields by application of a cyclical current waveform at the fundamental frequency with interruptions following the termination of each field, and a receiver gated to respond to secondary magnetic fields generated by the terrain only during predetermined intervals wholly within the interruptions.

* * * * *